C. C. FARMER.
SAFETY CAR CONTROL EQUIPMENT.
APPLICATION FILED JULY 26, 1921.
1,417,238.
Patented May 23, 1922.
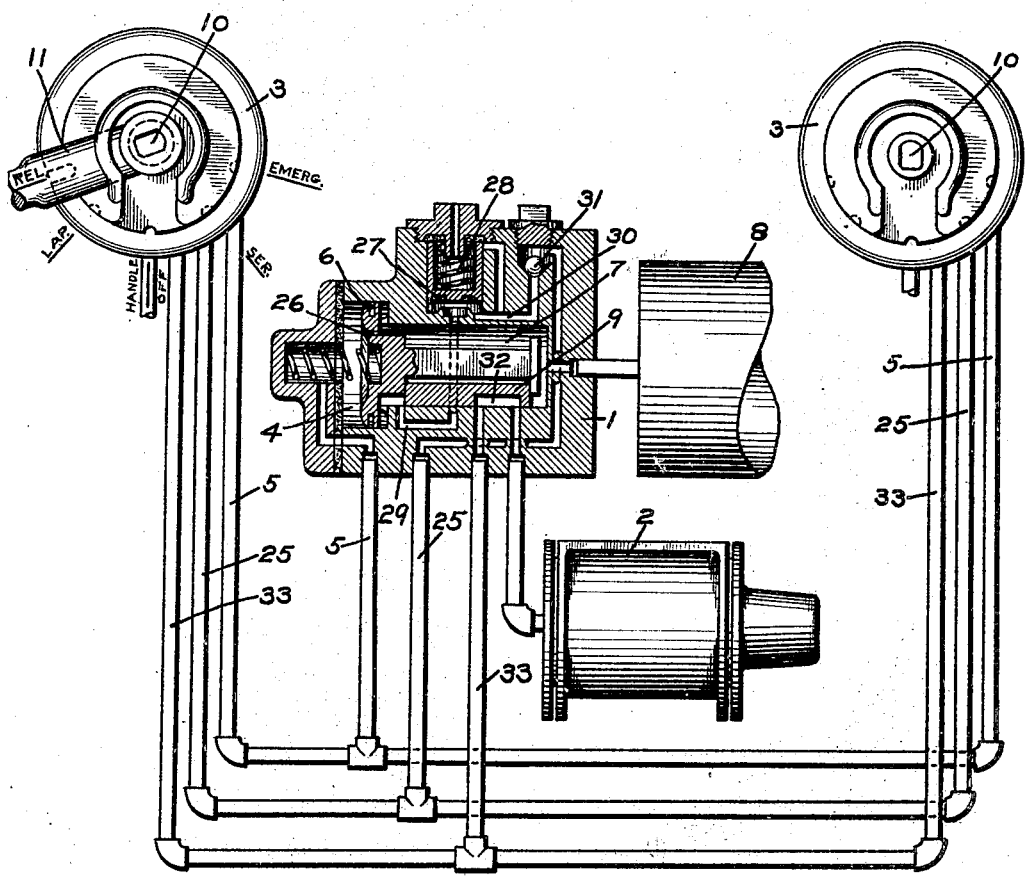
INVENTOR
CLYDE C. FARMER
BY
ATTORNEY

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

SAFETY CAR-CONTROL EQUIPMENT.

1,417,238.  Specification of Letters Patent.  Patented May 23, 1922.

Original application filed March 26, 1920, Serial No. 368,908. Divided and this application filed July 26, 1921. Serial No. 487,655.

*To all whom it may concern:*

Be it known that I, CLYDE C. FARMER, a citizen of the United States, residing at Pittsburgh, in the county of Allegheny and State of Pennsylvania, have invented new and useful Improvements in Safety Car-Control Equipments, of which the following is a specification.

This case relates to fluid pressure brakes, the present application being a division of application Serial No. 368,908, filed March 26, 1920.

The principal object of the invention is to provide means operated upon a predetermined reduction in main reservoir pressure for preventing loss of fluid from the main reservoir.

In the accompanying drawing, the single figure is a diagrammatic view, with the emergency valve device in section, of a car fluid pressure brake equipment, embodying my invention.

The equipment may comprise, as shown in the drawing, an emergency valve device 1, a brake cylinder 2, a brake valve device 3 at each end of the car, and a main reservoir 8.

The emergency valve device 1 may comprise a casing having a piston chamber 4, connected to emergency brake pipe 5 and containing a piston 6, and a valve chamber 7, connected to the main reservoir 8 and containing a slide valve 9 adapted to be operated by the piston 6. Each brake valve device 3 may comprise a valve body containing the usual rotary slide valve (not shown) and having ports and passages for controlling the application and the release of the brakes. The rotary valve being provided with a stem 10 adapted to be operated in the usual manner by a removable handle 11. Each brake valve device may be provided with the positions indicated in the drawing, namely; release, lap, handle off, service, and emergency application position.

According to my invention, means are provided for preventing the flow of fluid from the main reservoir to the main reservoir pipe line when the pressure in the main reservoir falls to a predetermined degree and for this purpose, a valve piston 27 is provided, which is subject on one side to the pressure of a coil spring 28 and on the opposite side to the pressure of fluid in valve chamber 7, as supplied thereto, through passage 29.

The spring 28 tends to seat the valve piston 27 and when the fluid pressure in valve chamber 7, acting on the inner seated area of the valve piston, exceeds a predetermined degree, according to the pressure at which the spring 28 is adjusted, the valve piston will be lifted from its seat, and fluid from the valve chamber 7 and the main reservoir 8 will flow to passage 30 and thence past the check valve 31 to the main reservoir pipe 25.

In operation, the brakes may be applied and released by manipulation of either one of the brake valves 3, the emergency brake pipe 5 being normally charged with fluid under pressure by flow from valve chamber 7 and the main reservoir 8 through the restricted port 26 in the emergency piston 6.

So long as the main reservoir pressure is maintained above a predetermined degree, the valve piston 27 will be maintained in its open position, so that fluid under pressure will be supplied through passage 29 past the valve piston 27 to passage 30 and thence past the check valve 31 to the main reservoir pipe line 25. If, however, the main reservoir pressure should fall below a predetermined degree, for example, by reason of a break or leak in the main reservoir pipe line 25, the valve piston 27 will be moved by the spring 28 to its closed position, cutting off communication from the valve chamber 7 and the main reservoir to the main reservoir pipe line 25. Thus the pressure in the main reservoir will be prevented from leaking off and will be available in case an emergency application of the brakes is made.

It will be understood that when the pressure in the emergency brake pipe 5 is reduced, the emergency piston 6 and the slide valve 9 will be shifted to emergency application position, in which fluid is supplied from valve chamber 7 and the main reservoir 8 directly to the brake cylinder 2.

Having now described my invention, what I claim as new and desire to secure by Letters Patent, is:—

1. In a fluid pressure brake, the combination with a reservoir adapted to be charged with fluid under pressure and a pipe line adapted to be charged with fluid under pressure from the reservoir, of means operated upon a predetermined reduction in pressure in the reservoir for cutting off communication from the reservoir to the pipe line.

2. In a fluid pressure brake, the combination with a main reservoir adapted to be normally charged with fluid under pressure and a main reservoir pipe line adapted to be charged with fluid under pressure from said main reservoir, of means normally establishing communication from the main reservoir to the main reservoir pipe line and operated upon a predetermined reduction in pressure in the main reservoir for cutting off said communication.

3. In a fluid pressure brake, the combination with a main reservoir adapted to be normally charged with fluid under pressure and a pipe line adapted to be charged with fluid under pressure from the main reservoir, of a valve piston operated by main reservoir pressure for establishing communication from the main reservoir to said pipe line and a spring for actuating said valve piston to close said communication upon a predetermined reduction in the pressure of fluid flowing from the main reservoir to said pipe line.

In testimony whereof I have hereunto set my hand.

CLYDE C. FARMER.